(12) United States Patent
Ahya et al.

(10) Patent No.: US 7,277,726 B2
(45) Date of Patent: Oct. 2, 2007

(54) CONTROLLING WIRELESS MOBILE DEVICES FROM A REMOTE DEVICE

(75) Inventors: Deepak P. Ahya, Plantation, FL (US); Daniel A. Baudino, Lake Worth, FL (US); Zaffer S. Merchant, Parkland, FL (US)

(73) Assignee: Motorola, Inc., Schaumburg, IL (US)

(*) Notice: Subject to any disclaimer, the term of this patent is extended or adjusted under 35 U.S.C. 154(b) by 583 days.

(21) Appl. No.: 10/838,105

(22) Filed: May 3, 2004

(65) Prior Publication Data

US 2005/0259618 A1    Nov. 24, 2005

(51) Int. Cl.
    H04B 1/38    (2006.01)
(52) U.S. Cl. ............ 455/557; 455/418; 455/419; 455/420; 455/550.1
(58) Field of Classification Search ........ 455/557, 455/418, 420, 419, 422.1, 550.1
See application file for complete search history.

(56) References Cited

U.S. PATENT DOCUMENTS

| | | | |
|---|---|---|---|
| 5,325,361 A | * | 6/1994 | Lederer et al. ........ 370/401 |
| 5,909,183 A | * | 6/1999 | Borgstahl et al. ...... 340/825.22 |
| 6,556,840 B2 | | 4/2003 | Zicker et al. |
| 6,591,095 B1 | | 7/2003 | Palaniswamy et al. |
| 6,628,965 B1 | * | 9/2003 | LaRosa et al. .......... 455/557 |
| 2003/0078979 A1 | | 4/2003 | Sagi |

OTHER PUBLICATIONS

Symantec Enterprise Solutions, "Symantec pcAnywhere," www.symantec.com/pcanywhere. Apr. 22, 2004.
GOTOMYPC, "GoToMyPC," www.gotomypc.com, Apr. 22, 2004.
Citrix Systems, Inc., "GoToMyPC: Making Life Simpler for Remote and Mobile Workers," 1997-2004.
XANBOO, "Products," www.xanboo.com, Apr. 22, 2004.

* cited by examiner

Primary Examiner—Joseph Feild
Assistant Examiner—Khai Nguyen

(57) ABSTRACT

A method (300) of remotely controlling a wireless mobile device (105) can include the step of establishing (340) a communication channel between the wireless mobile device and a remotely located controlling device (120). At least one operation can be performed (355) using an interface (115) of the controlling device. Packetized data based upon the at least one operation can be conveyed across the communication channel. An indicator (111) can be presented (360) upon the wireless mobile device to indicate the device is being remotely controlled. A programmatic action can be performed upon the wireless mobile device responsive to the receipt to the packetized data.

23 Claims, 2 Drawing Sheets

CONTROLLING WIRELESS MOBILE DEVICES FROM A REMOTE DEVICE

BACKGROUND

1. Field of the Invention

The present invention relates to the field of wireless communication devices and, more particularly, to remotely controlling wireless communication devices.

2. Description of the Related Art

The complexity of mobile telephony devices continues to increase with the geometric growth of mobile device usage. It is typical for mobile devices to include configurable ring tones, call waiting, three way calling, one or more silent call indicators, speed dialing, voice command functionality, voice messaging, extensive phone book entries, and the like. Further, mobile devices can include video games, task management and scheduling tools, a wireless Web browser, e-mail options, video cameras, global positioning system (GPS) location mechanisms, and other features previously reserved for dedicated hardware devices. All of these functions and features can be contained within a tiny device, which often is operated by a user who has difficulty setting the correct time on his or her automobile stereo, let alone a sophisticated communication device.

Accordingly, many users of mobile devices are unable to properly utilize even basic features of their mobile devices without help. Worse, these novice users can often inadvertently configure their mobile devices in a manner which renders the device inconvenient or impossible to use. For example, a user can mistakenly configure a phone to ring silently, so that no indicator alerts the user of incoming calls. Consequently, a methodology is needed by which the configuration, functions, and features of a mobile device can be remotely manipulated.

Past endeavors in remotely manipulating mobile devices have relied upon rudimentary operations to control a tiny subset of the functions and features of the controlled device. For example, Dual Tone Multi-Frequency (DTMF) commands can be conveyed to a remotely located mobile device to trigger the dialing of an encoded telephone number. In another example, a voice command can be conveyed to the mobile device and thereafter handled as though the voice command was locally provided. In still another example, a textual message can be conveyed to and displayed upon the mobile device. Each of these techniques, however, results in extremely limited control of the mobile device and can require a controller to perform non-intuitive actions. Further, each of the past remote control techniques is implemented in a proprietary manner for a specific mobile telephony platform. No known existing devices substantially or fully access the capabilities of a mobile device from a remotely located device. Nor does a platform independent system exist that provides an intuitive interface for a controller to remotely manipulate a controlled mobile device.

SUMMARY OF THE INVENTION

The present invention provides a method, a system, and an apparatus for remotely controlling a mobile device in accordance with the inventive arrangements disclosed herein. A controlling device can be another mobile device, a computer, customer premise equipment and the like. All functions of the mobile device, which can include, but are not limited to, device configuration settings, resident applications, access restrictions, data, code modules, and the like, can be controlled utilizing the disclosed subject matter. Control can occur by passing packets of information across a data channel to the mobile device. The mobile device can utilize a remote link component to determine programmatic actions that are to be taken responsive to the received information packets. The programmatic actions can be specified in a generic format within the remote link component. A translator can then translate generically formatted commands/actions into device specific commands/actions.

Including a translator within a remote control architecture, permits remote control features to be deployed across multiple mobile telephony platforms while requiring minimal adjustments for accommodating device specific messaging formats and features. That is, while a translator may need to be adapted to a specific mobile device, the remote link, the controlling device, device commands, messaging conventions, and the like can be implemented in a platform independent fashion. This versatility can be extremely beneficial in the largely proprietary field of mobile telephony.

The situations in which remotely controlling mobile devices can be used are numerous and varied. For example, the remote control capabilities disclosed herein can be utilized by seniors and/or the handicapped, who frequently lack the ability to comprehend and/or operate the features of complex mobile devices. In another situation, parents can utilize remote control capabilities disclosed herein to establish parental controls upon and/or add reminders to mobile devices utilized by their children. In another example, secretaries and/or other assistants can add contacts, meetings, reminders, and the like upon the mobile device of their boss using the disclosed remote control methodology. In still another example, service centers and/or IT managers can utilize the disclosed invention to remotely test, upgrade, and/or configure a remotely located mobile device.

One aspect of the present invention can include a method of remotely controlling a wireless mobile device. The method can include the step of establishing a communication channel between a wireless mobile device and a remotely located controlling device. At least one operation can be performed using an interface of the controlling device. Packetized data based upon the operation can be conveyed across the communication channel. An indicator can be presented upon the wireless mobile device to indicate the device is being remotely controlled. A programmatic action can be performed upon the wireless mobile device responsive to the receipt to the packetized data.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

Another aspect of the present invention can include a framework for a wireless mobile device that is remotely controllable. The framework can include a remote data messaging component, a remote link component, and a local device control unit. The remote data messaging component can be disposed within a network layer of the wireless mobile device. The remote link component and the local device control unit can each be disposed within an application layer of the wireless mobile device. The remote data messaging component can convey packetized data between the wireless mobile device and a controlling device. The remote link component can interpret packets of data from the remote data messaging component. Interpretation of the data can result in one or more operations to be performed by the wireless mobile device. The local device control unit can interface with input/output mechanisms of the wireless mobile device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate and explain various embodiments in accordance with the present invention; it being understood, however, that the invention is not limited to the precise arrangements and instrumentalities shown.

DETAILED DESCRIPTION OF THE INVENTION

Figure 1:
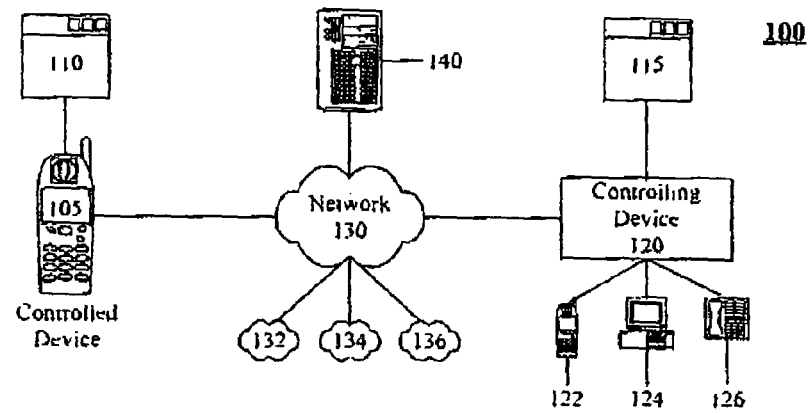
FIG. 1 is a schematic diagram of a system for remotely controlling operations of a mobile device in accordance with an embodiment of the inventive arrangements disclosed herein.

FIG. 1 is a schematic diagram of a system 100 for remotely controlling operations of a mobile device in accordance with an embodiment of the inventive arrangements disclosed herein. The system 100 can include a controlled device 105, a controlling device 120, and a remote computing resource 140.

The controlled device 105 can include any of a variety of mobile computing device, such as a cellular telephone, a Personal Communications Service (PCS) telephone, a personal data assistant with mobile telephony communication capabilities, a two way radio, and the like. The controlled device 105 can communicate using a multitude of mobile telephony techniques including, but not limited to, Global System for Mobile Communications (GSM) techniques, Time Division Multiple Access (TDMA) techniques, Code Division Multiple Access (CDMA) techniques, and/or Integrated Digital Enhanced Network (iDEN) techniques. Further, the controlled device 105 can communicate using a circuit based methodology as well as a packet based methodology. In one embodiment, the circuit based methodology can be a primary communication means for conducting speech communications over a voice channel. Similarly; the packet based methodology can be a principle communication means for conducting voice or data communications over a voice or data channel.

The controlled device 105 can include a user interface 110. The user interface 110 can include, but is not limited to, a keypad, an audio transducer, one or more function buttons, a display, a graphical user interface, and/or a speech interface. The user interface 110 can also include a multitude of menus, configuration options, and application programs.

The controlling device 120 can include any computing device that remotely controls the controlled device 105 across a network 130. The controlling device 120 can include a mobile computing device 122, a computer 124, customer premise equipment (CPE) 126, and the like. The controlling device 120 can also include a user interface 115 through which the remote control can occur.

In one embodiment, the user interface 115 can emulate the user interface 110 of the controlled device 105. In such an embodiment, user interface 115 can be synchronized with user interface 110 so that actions performed in the user interface 115 trigger behavior within controlled device 105. That is, an action performed within user interface 115 results in an equivalent action being performed within user interface 110. In another embodiment, the user interface 115 can differ from user interface 110, yet still trigger programmatic changes in the controlled device 105.

The remote computing device 140 can be utilized when remotely controlling the controlled device 105. In one embodiment, the remote computing device 140 can include configuration settings for the controlled device 105. These configuration settings can be accessed by the controlling device 120 to determine device specific parameters. In another embodiment, the remote computing device 140 can provide one or more speech services, such as an automatic speech recognition (ASR) service or a text-to-speech (TTS) service. The remote computing device 140 can also provide security and/or message conversion features, which are utilized when controlling the controlled device 105. In still another embodiment, the remote computing device 140 can include a multitude of configuration options, such as JAVA modules, ring tones, games, application utilities, handicap features, and the like. The controlling device 120 can remotely apply any of these options to the controlled device 105, even though some of the options may require files to be downloaded into the controlled device 105.

Network 130 can communicatively link the controlled device 105, the controlling device 120, and the remote computing resource 140 to each another. The network 130 can include a multitude of connected networks including an Internet, intranets, and local area networks. The network 130 can also include open, trusted, and/or secure sub-networks. Further, the network 130 can utilize landlines, localized wireless communications like the 802.11 family of wireless networking communications, long distance wireless communications like satellite and microwave communications, and other such communication pathways. More specifically, the network 130 can include a wireless communication network 132, a telephony network 134, or an internet protocol (IP) network 136.

In one arrangement, mobile device 122 can be communicatively linked directly to the controlled device 105 via the wireless communication network 132. For example, the controlled device 105 and the mobile device 122 can be similar types of mobile devices, having similar features, perhaps even being serviced under a common mobile telephony plan. In such an example, actions performed upon the mobile device 122 can responsively affect the controlled device 105 instead of resulting in changes to the mobile device 122 upon which the changes are entered.

In another arrangement, the controlling device 120 can be a computer 124 communicatively linked to the IP network 136. The IP network 136 can be connected to the wireless communication network 132 via a gateway, which is in turn communicatively linked to the controlled device 105. The computer 124 can include a software application designed to control the controlled device 105. The software application can emulate the functions and features of the controlled device 105. Further, the application can be used to control different controlled devices 105, where control options provided by the software application can differ in accordance with the capabilities of the controlled device 105.

In yet another arrangement, the controlling device 120 can include CPE 126 linked to a telephony network 134, such as the Public Switched Telephone Network (PSTN). Voice and DTMF signals from the CPE 126 can be converted into packetized data by a remote computing device 140, such as a voice server. The converted signals can be conveyed to the controlled device 105 via the wireless communication network 132.

In one embodiment, the CPE 126 can include a modified landline phone that includes a remote link framework to enable the landline phone to remotely control the controlled device 105. For example, a peer-to-peer control link can be established between the landline phone and the controlled device 105, where control signals can be passed between the landline phone and the controlled device 105 over a communication connection. The communication connection can include a packet switched as well as a circuit switched connection.

In operation, a user of the controlled device 105 can use the interface 110 to request remote assistance. The request can be conveyed across the network 130 to a designated controlling device 120. In one embodiment, the controlling device 120 can be a device similar to the controlled device 105. The controlling device 120 can remotely control the controlled device 105 in a peer-to-peer fashion. That is, selections can be made upon the controlling device 120 that can control the behavior of the controlled device 105.

It should be noted that remote assistance can be provided by several different controlling devices 120 operated by different assistants, such as a care taker, a family member, a service technician, and the like. The controlled device 105 can establish a priority list for accessing the different controllers. The order specified within this list can be followed to sequentially contact different controlling devices 120. When the controlling device 120 with the highest priority is not available, a control request can be conveyed to the controlling device 120 with the next highest priority level. Control requests can be conveyed to different controlling devices 120 until the selected controlling device 120 is available for controlling the controlled device 105. Furthermore, each of a number of remote controllers providing remote assistance can be given a different level of control as desired. For example, one remote controller can be enabled to just access or modify a phonebook or datebook on a controlled device as opposed to another remote controller being able to just access J2ME applications and related data. Yet another remote controller such as a carrier (but not necessarily) can be given access to persistent configuration settings (to provision different services). The level of control can be set and reset as appropriate as similarly done in local area networks.

Figure 2:
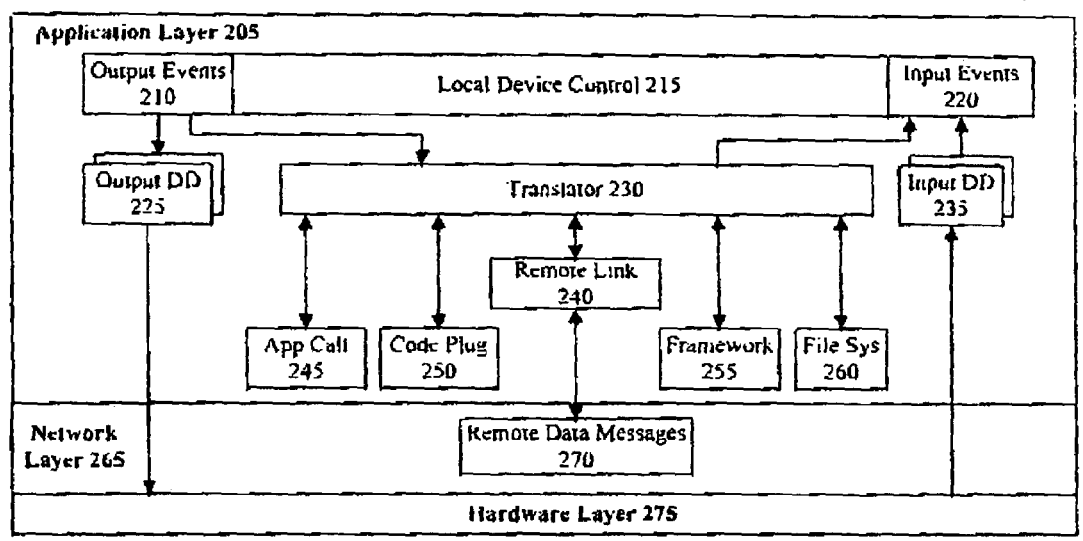
FIG. 2 is a schematic diagram of an illustrative architecture for a mobile device that can be remotely controlled in accordance with an embodiment of the inventive arrangements disclosed herein.

FIG. 2 is a schematic diagram of an illustrative architecture 200 for a wireless mobile device that can be remotely controlled in accordance with an embodiment of the inventive arrangements disclosed herein. The architecture 200 can include an application layer 205, a network layer 265, and a hardware layer 275.

The application layer 205 can include a local device control unit 215, a translator 230, a remote link 240, at least one input device driver 235, and at least one output device driver 225. Output device drivers 225 can include a display driver, an audio output driver, a file output driver, and the like. Input device drivers 235 can include a keypad driver, a touch screen driver, a pointing device driver, a file input driver, and the like.

The local device control unit 215 can interface with the input mechanisms 220 and the output mechanisms 210 of the mobile device. That is, the local device control unit 215 can interface with the ergonomic aspects of the mobile device such as the display, keyboard, GUI, transducers, and the like. The input mechanism 220 can accept and interpret input from the input device drivers 235 received via the hardware layer 275. The output mechanism 210 can generate and convey output to the output device drivers 225. The output device drivers 225 can then reformat the output and convey it to suitable components within the hardware layer 275 for presentation.

The translator 230 can translate data between a device independent format and a device specific format. Externally provided input can be conveyed to the input mechanism 220 via the translator 230. Further, the output can be conveyed to a remote source from the output mechanism 210 via the translator 230. The translator 230 can be programmatically configured for different wireless mobile devices. That is, framework 200 can be applied to a multitude of different mobile devices by programmatically adjusting the translator 230. The translator 230 can logically connect the local device control unit 215 and the remote link 240 to an external controlling device communicatively coupled via network layer 275 using remote data messages 270 for example.

The remote link 240 can interpret packets of data conveyed within remote data messages 270 into operations to be performed by the mobile device. The remote link 240 can also packetize output from the output mechanism 210 into remote data messages 270.

The application layer 205 can also include a plurality of modules that can include an embedded application (telephony, Date book, Phone book, etc.) module 245, a persistent configuration setting module 250, an application framework module 255, and/or a file system module 260. In one embodiment, the translator 230 can interface each of these modules with other architecture 200 components. The embedded application module 245 can call application routines of the wireless mobile device. These application routines can be remotely triggered and/or updated from a remote source.

The persistent configuration setting module 250 can include a programmable memory that can be remotely accessed by authorized users to enable or disable a plurality of options and functions on the wireless mobile device. In some cases, the persistent configuration setting module 250 can include subscriber, device, or carrier identity information similar to information commonly found in Subscriber Identity Module (SIM) cards. The persistent configuration setting module 250 can also come in other memory formats including, but not limited to Flash memory, and an Erasable Programmable Read-Only Memory (EPROM), and the like.

The application framework 255 can include a standardized software framework for mobile wireless information devices as well as related run-time modules, software objects, libraries, tools, and the like. For example, the application framework 255 can include, but is not limited to, Micro Edition (J2ME), Microsoft .Net Compact Framework, and the like. The file system 260 can include a storage and data retrieval space for files used within the application layer 205.

The remote data messages 270 can be packetized in accordance to a standardized packetizing methodology. In one embodiment, the remote data message 270 can include a component field, a size of data content, followed by a data content field. Table 1 details such an arrangement.

TABLE 1

Remote Data Message

| Component | Size | Data Content |
|---|---|---|
| | | |

The component field can indicate the framework 200 component that is to receive a message. For example, components can include the input mechanism 220, the output mechanism 210, the persistent configuration setting 250, the file system 260, the application framework 255, the embedded application 245, and the like. The size field can be an integer representation of the bit size of the data content.

The data format of the data content field can depend upon the component type to which it relates. For example, when the content type is a keypad, the data content can include an American Standard Code for Information Interchange (ASCII) key code representation. In another example, the data content can be a display bitmap, when the corresponding component type represents a graphic display. Additionally, when the component represents a control event, the associated data content can include an event Frame. Table 2 details the aforementioned arrangement.

TABLE 2

| Component | Size | Data Content |
|---|---|---|
| Device Control: Input Mechanism | XX | Key Code (ASCII) |
| Device Control: Output Mechanism | XX | Display Bitmap |
| Device Control Event: | | |
| Persistent Configuration Settings | XX | Event Frame |
| File System | XX | Event Frame |
| Application Framework | XX | Event Frame |
| Embedded Application | XX | Event Frame |
| Generic Event | XX | Event Frame |

An event frame can include an application field, a size, an action, and/or data for the action. Table 3 details such an arrangement.

TABLE 3

Event Frame

| Application | Size | Action | Data |
|---|---|---|---|
| | | | |

Each of the different event frames types (embedded application 245, file system 260, persistent configuration setting 250, and application framework 255) can include different information. For example, the embedded application 245 can trigger exposed methods of any application hosted upon the wireless mobile device. For example, the applications can include, but are not limited to, a phone book, a date book, and messages. Each action can include an associated permission like read/write/delete. The data can include entries for the related applications. For example, data for the phone book application can include a phone book (PB) entry. Data for the date book application can include a date book (DB) entry. Data for the messages application can include a message entry. Table 4 details this arrangement.

TABLE 4

Component: Local Device Control

| Application | Size | Action | Data |
|---|---|---|---|
| Phone Book | XX | write/read/delete | PB Entry |
| Date Book | XX | write/read/delete | DB Entry |
| Messages | XX | write/read/delete | Message |

The file system 260 type event frame can specify an action to be taken, a data size, and a data content field. The actions can include, but are not limited to, a copy file action, a delete file action, an edit file action, and a get file action. Table 5 illustrates an exemplary file system event frame.

TABLE 5

Component: File System

| Action | Size | Data |
|---|---|---|
| Copy File | XX | Filename |
| Delete File | XX | Filename |
| Edit File | XX | Changes |
| Get File | XX | Filename |

The persistent configuration setting 250 event frame can specify an action to be taken, a data size, a code plug unit, and a data content field. The actions can include, but are not limited to, read and/or write actions. Table 6 illustrates an exemplary code plug 250 event frame.

TABLE 6

Component: Persistent Configuration Setting

| Action | Size | Code Plug Unit | Data |
|---|---|---|---|
| Read | XX | Unit Type | Config. Data |
| Write | XX | Unit Type | Config. Data |

The application framework 255 event frame can specify an action to be taken, a data size, and a data content field. The actions can include, but are not limited to, launch, install, and delete actions. Actions can also include remotely generated input/output messages. Table 7 illustrates an application framework 255 event frame.

TABLE 7

Component: Application Framework

| Action | Size | Data |
|---|---|---|
| Launch | XX | Application Name |
| Install | XX | Application Name |
| Delete | XX | Application Name |
| Application UI Input(*) | XX | Input Type |
| Application UI Output(*) | XX | OutputType |

(*)Input/output generated remotely (i.e. voice, keypad, etc.)

It should be noted, that the remote data messages 270 can be configured in a variety of manners and the invention is not to be limited to the message format depicted by Tables 1-7, which have been provided for illustrative purposes only.

Further, it should be appreciated that the subject matter disclosed herein is not to be limited to the precise arrangements shown within the architecture 200. For example, in one deviating embodiment, the architecture 200 need not include the translator 230 and all components which connect to the translator 230 and can instead be directly connected to the remote link 240. In such an embodiment, the remote link can be designed specifically for the wireless mobile device to which it is disposed. That is, the remote link 240 can convert the remote data messages 270 directly into device specific operations/input that can be programmatically acted upon by the wireless mobile device as appropriate.

Figure 3:
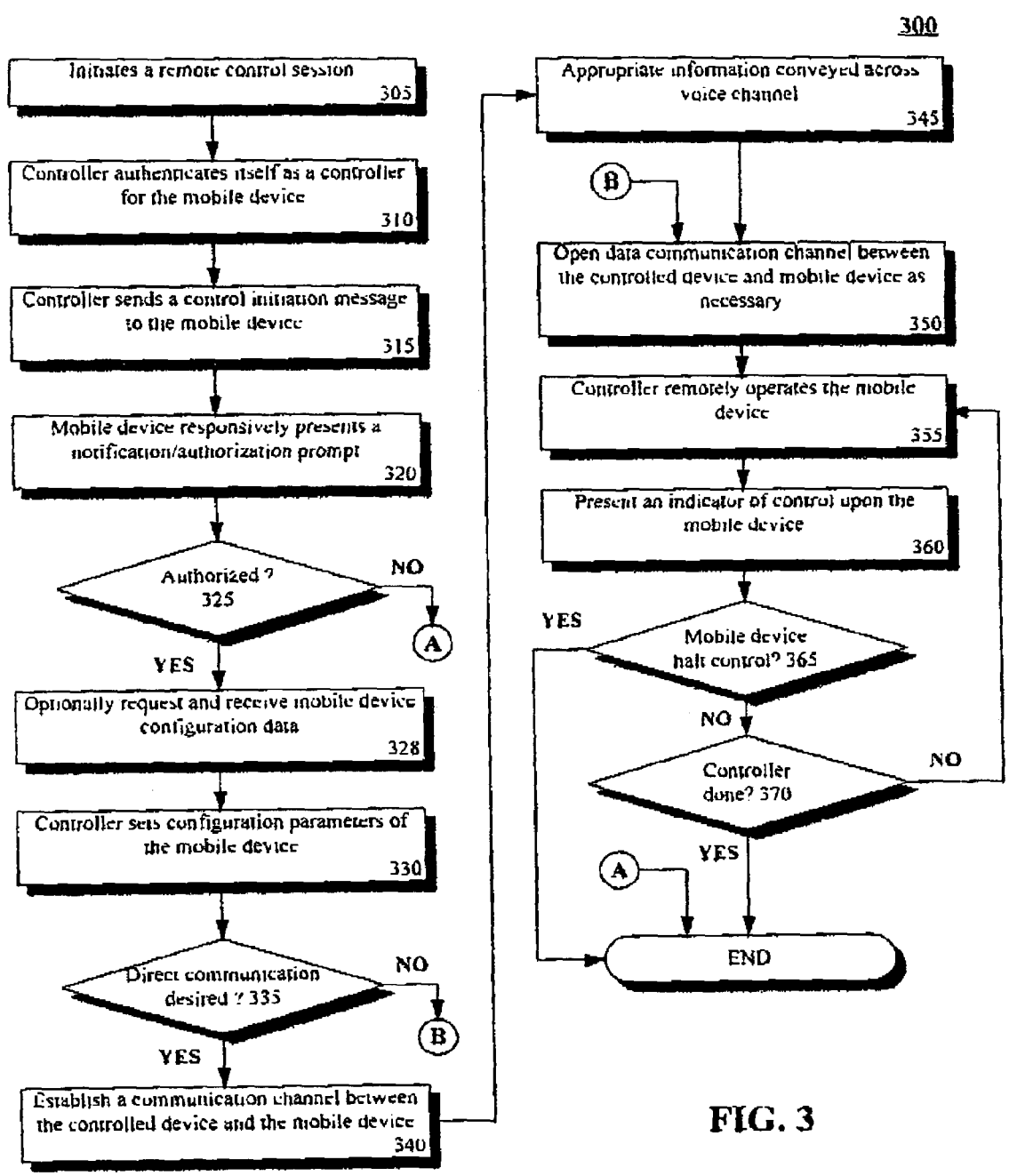
FIG. 3 is a flow chart illustrating a method for remotely controlling a mobile device in accordance with an embodiment of the inventive arrangements disclosed herein.

FIG. 3 is a flow chart illustrating a method 300 for remotely controlling a mobile device in accordance with an embodiment of the inventive arrangements disclosed herein. The method can begin in step 305, where a remote control session can be initiated. In one arrangement, a user of the mobile device can initiate the control session. For example, a button can be included upon the mobile device, which can be selected by the user to initiate the control session. Alternatively, the user can issue a speech command and/or provide some other input to initiate the control session. In another arrangement, a controller can initiate the remote control session.

In step 310, the controller can authenticate itself as a controller for the mobile device. The controller and/or the mobile device can initiate authentication routines at this step. Appreciably, authentication can be automatic, can require a hardware identification code, and/or can require the passing and confirmation of a security identifier, such as a certificate, a public key, a password, and the like. Different controlling devices can be granted different remote control privileges according to previously established access rights.

After authentication, the method can proceed to step 315, where a control initiation message can be sent from the controller to the mobile device. In step 320, the mobile device can responsively present a notification or authorization prompt to a user. Notification can include presenting a text message and/or a graphic upon a display of the mobile device that indicates the device is being remotely controlled. Notification is not limited in this regard, however, and other notification means, such as playing an audible tone and/or flashing a LED can be utilized. Authorization can prompt a user of the mobile device to accept or deny the remote control attempt. It should be noted that step 320 can be skipped in embodiments where user notification/authorization is not desirable.

In step 325, a determination can be made as to whether the control attempt has been authorized. If authorization for the control session is denied, the method can end. If authorization for the control session is granted or not necessary, the method can proceed to step 328. In step 328, the controller can operationally request mobile device configuration data. The mobile device can responsively provide the requested configuration data. This step is particularly important in embodiments where mobile device characteristics are not known at the time a control session was initiated. The lack of knowledge in regards to device characteristics can commonly occur in embodiments where the method 300 is applied to a multitude of different types of mobile devices with different configuration options and/or settings.

In step 330, the controller can set configuration parameters of the mobile device. For example, the controller can turn an auto answer option of the mobile communication device on, so that the device will automatically respond to subsequent communication attempts. In another example, the controller can turn call-waiting features off, so that control operations are not interrupted by external callers. After the control session, the call-waiting features can be turned back on or placed in a pre-existing condition before the control session.

In step 335, a determination can be made as to whether a direct communication between an administrator utilizing the controller and the user of the mobile device should occur. Such communications can be common, when the user of the mobile communication device initiated the control session in order to inform an administrator of a problem that the user is experiencing so that appropriate corrective actions can be taken. Direct communication can include a multitude of different communication techniques including, but not limited to, voice communications via voice over internet protocol (VOIP) and/or circuit-switched telephony channels, chat sessions, video teleconferencing, instant messaging, e-mailing, and the like.

When a direct communication is not desired, the method can advance to step 350. When direct communication is desired, the method can proceed to step 340, where a communication channel can be established between the controlled device and the mobile device. In step 345, appropriate information can be conveyed across the voice channel (or other communication channel). In step 350, a data communication channel can be opened between the controlled device and the mobile device. If a mobile telephony device only permits a single communication channel to be open at any one time, any open voice channel established in step 340 may have to be closed before the data channel can be established. If a data channel has already been established in step 340, this data channel can be used and a new data channel need not necessarily be established in step 350.

In step 355, the controller can remotely operate the mobile device. Full control of the mobile device can be granted at this stage, where control includes keypad control, display control, menu navigation control, application launch control, file download/upload control, co-browsing capabilities, dialog establishment with the mobile device, and the like. In step 360, an indicator of control can be presented upon the mobile device. In one embodiment, the indicator can include a graphic and/or message showing that the mobile device is in "assisted mode" as illustrated by indicator 111 in FIG. 1 on the mobile device 105. In another embodiment, the alternations directed by the controller can be presented in a stepwise fashion upon the mobile device or shown via messages in near-real time as the alternations are being made.

The user of the mobile device can be provided with an option of halting the remote control of the mobile device. In step 365, a determination can be made as to whether the user has triggered an event to halt the remote control session. If the user has elected to halt the remote control session, the method can end. If the user has not elected to halt the remote control session, the method can proceed to step 370, where a determination can be made as to whether the controller has finished remotely controlling the mobile device. If the controller has finished controlling the device, the method can end. Otherwise, the method can loop to step 355, where more commands can be issued by the controller and appropriate actions can be responsively performed on the mobile device.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of remotely controlling a wireless mobile device, comprising the steps of:
    performing at least one operation using an interface of a controlling device;
    conveying packetized data based upon said at least one operation across a communication channel;
    enabling an indicator upon a wireless mobile device to indicate the wireless mobile device is being remotely controlled;
    initiating the execution of a programmatic action upon the wireless mobile device responsive to a receipt of the packetized data, and
    emulating a first user interface of the wireless mobile device on a second user interface of the controlling device.

2. The method of claim 1, further comprising the step of:
    initiating a remote control session from the wireless mobile device and
    synchronizing the second user interface with the first user interface so that actions performed on the second user interface trigger behaviors within the wireless mobile device corresronding to controls of the first user interface.

3. The method of claim 2, wherein the wireless mobile device specifies a set of a plurality of controlling devices, said method further comprising the step of:
    selecting one of the controlling devices from the specified set of controlling devices in accordance with a priority ordering.

4. The method of claim 3, further comprising the steps of:
    determining that the selected controlling device is unavailable for controlling the wireless mobile device; and
    repeating said selecting step for different controlling devices included within the specified set of controlling devices until a selected controlling device is available for controlling the wireless mobile device,
    wherein different levels of control are assigned to the controlling device by the controlled device.

5. The method of claim 1, wherein said controlling device is a wireless mobile telephone, said interface being an interface for locally operating said controlling device as a stand-alone mobile device, said method further comprising the step of:
    placing the controlling device in a remote control mode, wherein selections made upon the controlling device when in the remote control mode result in actions corresponding to selections occurring upon the wireless mobile device.

6. The method of claim 1, wherein the controlling device is customer premise equipment that includes a remote link framework for communicating with the controlled device in a peer-to-peer fashion.

7. The method of claim 1, further comprising the steps of:
    before the performing step, requesting configuration data from the wireless mobile device by the controlling device;
    conveying the requested configuration data to the controlling device by the wireless mobile device; and
    tuning the interface of the controlling device based upon the configuration data.

8. The method of claim 1, further comprising the steps of:
    before conveying the packetized data, conveying an authorization key from the controlling device to the wireless mobile device; and
    authorizing the remote control based at least in part upon the authorization key provided by the wireless mobile device.

9. The method of claim 1, further comprising the steps of:
    before conveying the packetized data, prompting a user of the wireless mobile device to permit the controlling device to remotely control the wireless mobile device, a granting of remote control being dependant upon a response to the prompting.

10. The method of claim 1, further comprising the step at the wireless mobile device of:
    halting remote control from the controller responsive to a user selection made upon the wireless mobile device.

11. The method of claim 1, further comprising the steps at the wireless mobile device of:
    translating the packetized data from a device independent format into a specific format for the wireless mobile device, the executed programmatic action being based upon the data translated into the specific format.

12. A framework for emulating a first user interface of a wireless mobile device that is remotely controllable, comprising:
    a remote data messaging component, wherein the remote data messaging component is configured to convey packetized data that emulates the first user interface and emulates input/output controls of the first user interface between said wireless mobile device and a controlling device having a second user interface a remote link component, wherein the remote link component is configured to interpret packets of data from the remote data messaging component to perform at least one operation that emulates a control of the first user interface; and a local device control unit that interfaces with input/output mechanisms of the wireless mobile device.

13. The framework of claim 12, wherein the remote data messaging component is disposed within a network layer of the wireless mobile device and the remote link component and the local device control unit are disposed within an application layer of the wireless mobile device and the remote link component synchronizes the second user interface with the first user interface so that actions performed on the second user interface trigger controls of the first user interface within the wireless mobile device.

14. The framework of claim 13, further comprising:

a translator disposed within the application layer of the wireless mobile device, the translator logically connecting the remote link component and the local device control unit.

15. The framework of claim 14, wherein said translator is configured to translate remote control operations between a device independent format used by the remote link component and a specific format for the wireless mobile device.

16. The framework of claim 14, wherein said translator is programmatically configurable for different wireless mobile devices, wherein applying said framework to a different type of wireless mobile device involves programmatically configuring said translator.

17. The framework of claim 14, further comprising:

an application call module configured to call application routines of the wireless mobile device responsive to remotely received messages; and a code plug module including a programmable memory, wherein data within said programmable memory is remotely accessible, said translator logically connecting the application code module and the code plug module within the framework.

18. The framework of claim 14, further comprising:

a framework module defining a standardized software framework for mobile wireless information devices; and a file system module providing access to a plurality of files utilized by the wireless mobile device, the translator logically connecting the framework module and the file system module within the framework.

19. A machine-readable storage having stored thereon, a computer program having a plurality of code sections, the code sections executable by a machine for causing the machine to:

perform at least one operation using an interface of a controlling device;

enable a receipt of packetized data based upon the at least one operation across a communication channel;

enable a presentation of an indicator upon a wireless mobile device to indicate the wireless mobile device is being remotely controlled; and initiate execution of a programmatic action upon said wireless mobile device responsive to a receipt of the packetized data and emulating a first user interface of the wireless mobile device on a second user interface of the controlling device.

20. The machine-readable storage of claim 19, wherein the controlling device is a wireless mobile telephone, the interface being an interface for locally operating the controlling device as a stand-alone mobile device, the machine-readable storage further including code sections for causing the machine to:

place the controlling device in a remote control mode, wherein selections made upon the controlling device when in the remote control mode result in actions corresponding to the selections occurring upon the wireless mobile device and synchronize the second user interface with the first user interface so that actions performed on the second user interface trigger behaviors within the wireless mobile device corresronding to controls of the first user interface.

21. The machine-readable storage of claim 19, further having code sections executable by the machine for causing the machine to:

request configuration data from the wireless mobile device before the step of performing at least one operation;

receive the requested configuration data; and tune the second user interface of the controlling device based upon the configuration data associated with a control of the first user interface.

22. The machine-readable storage of claim 19, further having code sections executable by the machine for causing the machine to:

receive a request for configuration data before the step of performing at least one operation; and transmit the requested configuration data to the controlling device.

23. The machine-readable storage of claim 19, further having code sections executable by the machine for causing the machine to:

translate the packetized data from a device independent format into a specific format for the wireless mobile device, said executed programmatic action being based upon the data translated into the specific format.

* * * * *